June 2, 1936.  S. F. ANDERSON  2,042,453
APPARATUS FOR FILLING CONTAINERS
Filed Jan. 9, 1933   2 Sheets-Sheet 1
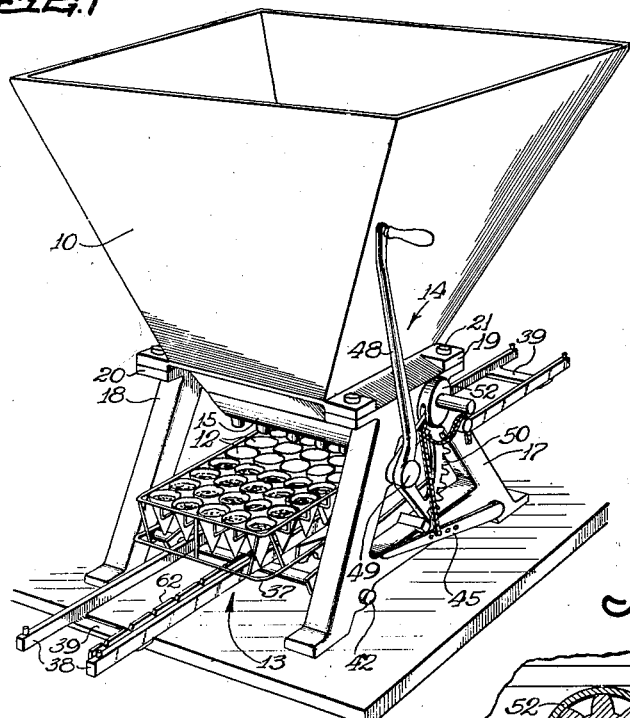
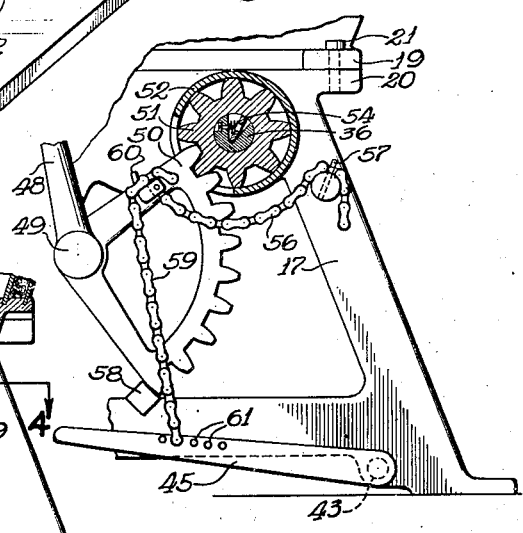
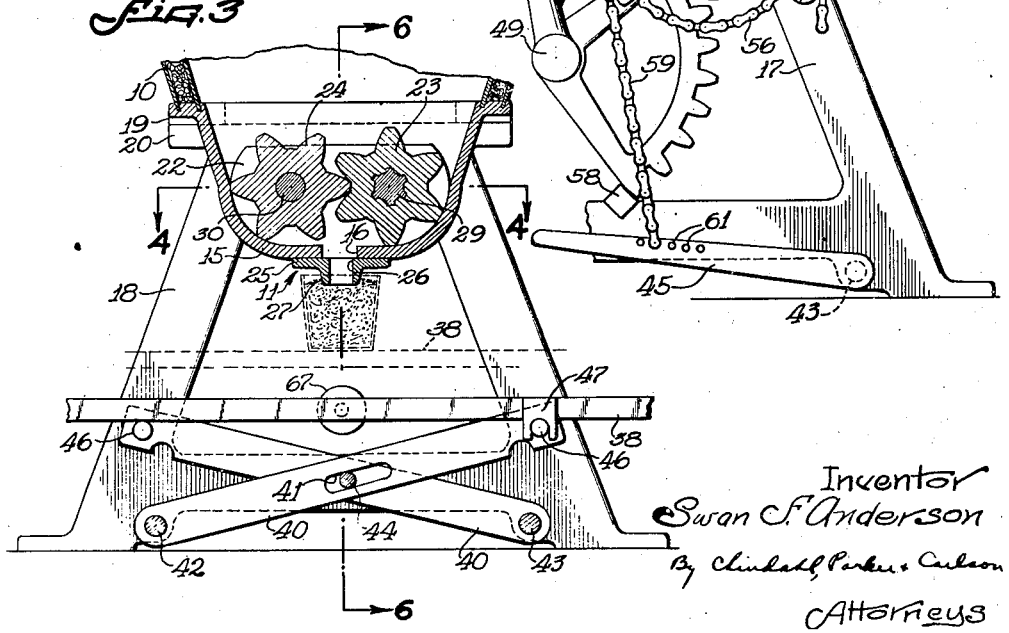
Inventor
Swan F. Anderson
By Chindahl, Parker & Carlson
Attorneys June 2, 1936.  S. F. ANDERSON  2,042,453
APPARATUS FOR FILLING CONTAINERS
Filed Jan. 9, 1933  2 Sheets-Sheet 2
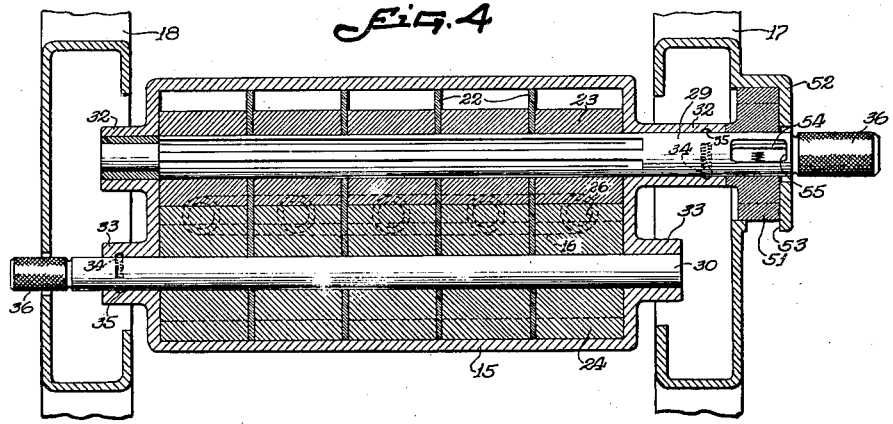
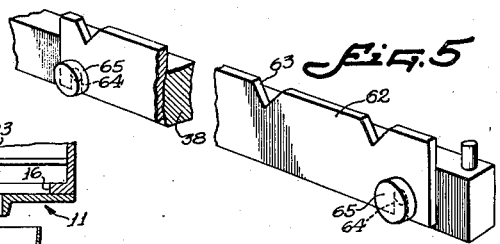
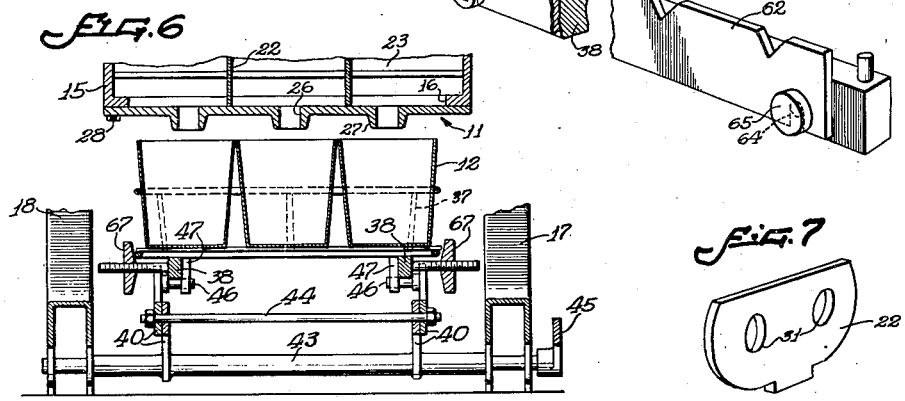

Patented June 2, 1936

2,042,453

UNITED STATES PATENT OFFICE 2,042,453

APPARATUS FOR FILLING CONTAINERS

Swan F. Anderson, Rockford, Ill.

Application January 9, 1933, Serial No. 650,847

24 Claims. (Cl. 226—94)

The invention relates to an apparatus for filling cups or other containers with a semi-fluid product such as partially frozen ice cream or the like.

The general object of the invention is to provide an apparatus of the type described which may be cleaned easily and thoroughly; which may be quickly adapted to fill containers of varying size or height; and which may be built at low cost.

It is also an object of the invention to provide an apparatus having means within the hopper for dispensing the product contained therein, which means is readily removable from the hopper.

Still another object is to provide, in a filling apparatus having a rotary dispensing means and a reciprocable support for presenting to the dispensing means the containers to be filled, a single actuator for both the dispensing means and the support.

A further object is to provide a filling apparatus especially adapted for manual operation and yet capable of filling containers at a rate comparable to or exceeding that of automatic machines.

A further object is to provide a novel method of filling containers which prevents dripping from the spout of the dispensing means.

A further object is to provide a new and improved apparatus by which containers may be filled with material such as semi-fluid ice cream and the contents of the container formed in specially shaped layers or portions of different flavors or colors.

Other objects and advantages will become apparent from the following detailed description taken in connection with the accompanying drawings, in which:

Figure 1 is a perspective view of an apparatus embodying the features of the invention.

Fig. 2 is a fragmentary view of the actuating means for the machine, part of which is shown in section.

Fig. 3 is a fragmental vertical section taken substantially along the longitudinal center line of the apparatus shown in Fig. 1.

Fig. 4 is a sectional view taken substantially along line 4—4 of Fig. 3.

Fig. 5 is a detail of a device controlling the positioning of the containers to be filled.

Fig. 6 is a sectional view taken substantially along line 6—6 of Fig. 3 illustrating a different form of discharge spout.

Fig. 7 is a perspective view of a partition employed in the hopper.

Fig. 8 is a sectional view of a modified form of discharge device.

Fig. 9 is a partially-sectioned perspective view of still another form of discharge device.

While the filling apparatus, shown in the drawings for the purpose of illustrating the invention, may be employed with any semi-fluid product, it is especially intended for use in filling containers with ice cream. Generally stated, the apparatus comprises a hopper 10 supported in raised position and having at its lower end a combined measuring and discharging mechanism. This mechanism is composed of rotary means readily adapted to dispense simultaneously one or a plurality of measured quantities of ice cream, and a discharge device 11 cooperating with the rotary means to direct the flow of ice cream from the hopper into one or more containers 12 as desired. Below the hopper 10 is a carriage or platform 13 upon which the containers are supported. The carriage 13 is reciprocable vertically, in order to present the containers to the discharge device 11, and is raised and lowered by the oscillatory movement of an actuator 14. This same actuator also has a driving connection with the rotary dispensing means.

The upper portion of the hopper 10 has insulated, downwardly converging side walls, while the lower portion is formed by a casting 15 defining an upwardly opening trough having its major dimension transversely of the apparatus. Extending longitudinally of the bottom of the casting 15 substantially throughout the length of the latter is an opening 16 which is covered by the discharge device 11 detachably secured to the casting so that the hopper may be equipped readily with a discharge device having spouts of any desired number or shape.

The hopper 10 is supported by a pair of standards 17 and 18 positioned on the sides of the hopper 10 opposite the ends of the trough-like casting 15. Herein the hopper is supported with the casting 15 below the top of the standards. For that purpose, the casting 15 is formed at its upper edge with an outwardly projecting flange 19 which rests upon the top of the standards 17 and 18 and is secured to extensions 20 thereof by screws 21. The upper parts of the standards are disposed at opposite ends of the casting 15 (see Fig. 4) and spaced from such ends.

Housed in the casting 15 is the dispensing means which herein is of a character adapted to discharge quickly and simultaneously one or a plurality of measured quantities of the material from the hopper 10. To that end, the dispensing means comprises removable, transverse partitions 22 (Figs. 4 and 7) dividing the casting 15 into a plurality of fluid-tight compartments arranged in a row lengthwise of the casting. In each of the compartments is a pair of intermeshing gears 23 and 24 mounted on parallel axes extending longitudinally of the casting. The faces of the gears 23 and 24 have a sliding but fluid-tight contact with the partitions 22 or the ends of the casting, as the case may be, while the teeth of each gear have a similar contact with the curved portion of the adjacent side of the casting 15 (see Fig. 3). Upon rotation of the gears 23 and 24 in a clockwise and counter-clockwise direction respectively, as viewed in Fig. 3, quantities of the material in the hopper will be entrapped between the gear teeth and carried down along the side walls of the trough, finally uniting with each other in the space between the gears and being discharged downwardly through the opening 16. A measured quantity of ice cream will thus be discharged from each of the compartments, the amount being dependent upon the extent of movement of the gears. By varying the number of partitions 22 and employing gears fitting properly within the compartments so formed by the partitions, any desired number of separate measured quantities may be withdrawn from the hopper and discharged downwardly. Thus in Figs. 1 and 4, the casting 15 is shown divided into five compartments while in Fig. 6 three compartments are formed.

The apparatus thus divided into compartments becomes operable to fill simultaneously a like number of containers when a discharge device 11 is employed which is designed to direct the ice cream discharged from each of the compartments into a separate container. The discharge device shown in Figs. 1, 4, and 6 takes the form of a substantially rectangular plate 25 having spaced apertures 26 corresponding in number to the number of compartments into which the casting 15 has been divided. Projecting downwardly from the plate are spouts 27 integral with the plate and forming continuations of the apertures 26. The apertures are spaced so as to provide an outlet for each of the compartments substantially at the center of each container. The discharge device is attached to the casting 15 by means of bolts 28 projecting through the plate at diagonally opposite corners. Thus, the plate may be detached readily and another substituted in adapting the machine for filling different numbers or shapes of containers.

To facilitate adaption of the apparatus for the simultaneous discharge of the number of measured quantities desired and also to facilitate cleaning of the apparatus, the partition 22 and the gears 23 and 24 are removable upwardly through the hopper 10. This is made possible herein by mounting the gears 23 and 24 respectively on shafts 29 and 30 axially withdrawable from the casting. Neither the partitions 22, each of which is formed with apertures 31 through which the shafts 29 and 30 project, nor the gears 23 and 24, are retained in the casting other than by the shafts 29 and 30. The casting too is free of inwardly projecting flanges immediately above the gears so that after withdrawal of the shafts 29 and 30 the partitions and gears may readily be lifted out of the hopper.

The shafts 29 and 30 are journaled respectively in bearings 32 and 33 formed integrally with the ends of the casting 15. One end of each shaft projects from the casting 15 and through the adjacent standard and at that end carries a spring pressed ball 34 engaging a groove 35 in the bearing yieldably to retain the shaft against axial movement. A knurled end 36 may be provided on each of the shafts to form a handle by which the shaft may be withdrawn. The gears are rotated by the shaft 29 on which the gears 23 are splined, the gears 24 being loose on the shaft 30.

The containers 12 to be filled are supported below the hopper 10 in a rectangularly shaped basket 37 placed on the carriage 13. The basket 37 is designed to retain the containers 12 in upright position and is advantageous in that it facilitates handling of the containers before and after filling and may be adapted readily for any style of container including inverted cone-shaped cups such as are shown in Fig. 1.

In filling containers with a material such as partially frozen ice cream, difficulty is frequently experienced in avoiding dripping of the cream from the spout after filling thereof and while another container is being moved into filling position. It is highly desirable that such dripping be eliminated without the provision of elaborate valve mechanism controlling the discharge outlets. This result is attained in the present instance by the use of the intermeshing gears which so completely fill the compartments in which they are disposed that material of the viscosity of partially frozen ice cream will not flow by gravity around the gears and down through the discharge outlets. Thus, the gears sustain the weight of the ice cream in the upper portion of the hopper so that by stopping the gears after a container has been filled, there is no downward pressure upon the cream retained in the discharge nozzle and this cream is held against dripping while the next unfilled container is being advanced into filling position. Additional provision is made for insuring a sharp cut-off of the cream and accurate measurement thereof. To this end, each container, when located for filling, is positioned with the lower end of the spout 27 projecting into the container below the level to which the container is to be filled. (See Fig. 3.) The additional pressure under which the cream in the spout is placed in order to force the final portions out and upwardly around the lower end of the spout results in a compression or compacting of the cream spout, thereby further overcoming any tendency of the cream to flow out by gravity after the filled container has been withdrawn.

To position the containers relative to the spouts 27 as above described, the carriage 13 is adapted for vertical reciprocatory movement. The carriage comprises a pair of spaced, parallel bars 38 extending transversely of the dispensing trough and connected near their ends by transverse members 39. Supporting the bars 38 are two pairs of crossed links 40 operable to impart vertical movement to the bars. One link of each pair of bars has, intermediate its ends, an elongated slot 41 and is rigid at the lower end with a rod 42 extending transversely between and journaled in the frames 17 and 18. The other links are fast on a rod 43 journaled in the standards 17 and 18 and these links are connected intermediate their ends by a rod 44 which projects through the slot 41 in the first mentioned links. The links are actuated by a lever 45 fixed to one end of the rod 43 projecting outwardly beyond the standard 17.

The bars 38 rest on pins 46 projecting inwardly and horizontally from the upper ends of the links 40. Each of the bars 38 has a single downwardly projecting lug 47 cupped to engage one of the pins 46 on a corresponding link of each pair. In that manner, the bars 38 are retained against longitudinal movement relative to one link of each pair while being permitted to move relative to the other link.

Reciprocation of the carriage 13 and actuation of the dispensing means are coordinated and operation of the apparatus rendered simple by the use of the single actuator 14. While in certain installations such an actuator may be power driven, the apparatus is herein shown adapted for hand operation. The actuator, therefore, takes the form of a lever 48 pivoted at 49 on the standard 17 and has a driving connection with the shaft 29 to effect a discharge of ice cream and also a connection with the lever 45 to effect reciprocation of the carriage. The driving connection with the shaft 29 comprises a gear segment 50 rigid with the lever 48 and a pinion 51 having a one-way driving connection with the splined shaft 29 and meshing with the gear segment 50.

The pinion 51 is enclosed in a housing 52 formed by a circular protrusion (Figs. 1 and 4) at the upper end of the standard 17. The housing 52 is formed with an elongated opening 53 into which the gear segment 50 projects for engagement with the pinion 52.

The one-way drive between the shaft and the pinion is shown here as a friction connection comprising a rectangular key 54 (Fig. 2) positioned in a V-shaped slot 55 in the shaft 29. The slot 55 has non-radial sides (see Fig. 2) with one side shorter and the other side longer than the key 54 which is spring-pressed toward the shorter side. In a clockwise rotation of the pinion 52 as viewed in Fig. 2, the key 54 is wedged tightly between the shaft 29 and the pinion 52 while in a counter-clockwise rotation of the pinion the key is loose in the slot and the pinion rotates relative to the shaft. The connection here described engages or disengages immediately and permits any degree of rotation of the shaft 29. Also, axial withdrawal of the shaft 29 is not interfered with by such a connection.

From the foregoing it is seen that the ice cream is discharged during the forward stroke of the lever 48. Since the apparatus is adaptable to fill containers of varying volume as well as shape, the quantity of ice cream discharged in each stroke of the lever must be variable also. Herein such variation in the quantity discharged is effected by controlling the length of the stroke of the lever 48. To that end, a chain 56 is permanently attached at one end to the gear segment 50 and is adjustably attached at the other end to the standard 17. The adjustable attachment to the standard 17 is here effected by a pin 57, rigid on the standard, over which the links of the chain are hooked. A lug 58 cast on the standard 17 in a position to be abutted by the gear segment 50 determines the normal position of the lever 48.

The connection between the lever 48 and the lever 45 of the carriage 13 is of a character such that the height to which the carriage is raised by any given stroke of the lever 48 also is variable. Thus, in filling containers of the same volume but of different height, the stroke of the lever 48 will remain the same while the movement imparted to the carriage must be longer for the shorter container; or, in filling containers of the same height but of different volume, the stroke of the lever 48 must be varied while the movement of the carriage must be the same. Herein such a connection is obtained by the use of a chain 59 connected to the gear segment 50 and the lever 45. Both ends of the chain are adjustable. The gear segment 50 carries a pin 60 over which the links of the chain 59 are hooked while the lever has a series of perforations 61 spaced along the same at which the chain may be attached. The attachment to the gear segment 50 thus provides a coarse link-by-link adjustment while the attachment at the lever 45 provides a fine adjustment.

Advance of the basket 37 successively to position containers below the discharge device 11 is here effected manually. After one row of containers 12 has been filled, the lever 48 is returned to normal position during which movement the pinion 52 turns idly upon the shaft 29 and the carriage 13 lowers of its own weight. Before the next forward stroke of the lever and preferably as soon as the carriage has been lowered sufficiently to enable the containers to clear the spout 27, the forward end of the basket 37 is lifted slightly and the basket slid forwardly along the bars 38. The operator may thus move the basket easily with his left hand while grasping the lever 48 with his right hand.

In order that the basket 37 may be positioned properly and without difficulty in the successive advancing movements, means is provided for enabling the operator to gauge readily the position to which the basket must be moved in order to present the next row of containers to filling position beneath the spout. Herein the gauge comprises a bar 62 having upwardly extending shoulders defined by notches 63 in its upper edge and adapted to be attached to one of the bars 38. The notches 63 are so spaced that when a shoulder, formed by the forward edge of the basket 37, is positioned in one of the notches, a row of containers will be properly located beneath the discharge device. The bar 62 has a slot 64 near each end and is attached to the bar 38 by slipping the slots 64 over the shanks of bolts 65 threaded into the bar. The bar 62 is thus rendered removable so that it can be replaced quickly and conveniently to accommodate containers of different sizes. In advancing the basket 37 during the filling operation, the shoulders are disengaged momentarily by lifting the forward edge slightly so as to clear the upper ends of the shoulders defined by the notches 63. Then when the next notch is reached, the forward edge of the basket will drop into the notch indicating to the operator that the next row of containers is positioned properly beneath the spout 27. During such advancing movement, the basket is retained against lateral displacement by guides 67 carried by the bars 38. The guides 67 are adjustable to accommodate baskets of different widths.

The machine above described not only is capable of filling a row of containers simultaneously but is readily adaptable to the filling of a single container with a plurality of different flavors or colors of ice cream and the formation of the different flavors in ornamental configurations of any desired shape. Accordingly, the different flavors of ice cream are discharged into the container simultaneously and later frozen as a unit thereby avoiding the inconvenience of prior methods wherein the bars or shapes of different flavor are frozen separately and then assembled in the container.

For example, to make bricks or blocks having three distinct layers of ice cream each of a separate flavor or color, the casting 15 would be divided into three compartments in the manner previously described and the partitions 22 which are used would be deep enough to divide the entire hopper 10 into separate compartments (see Fig. 8) for receiving the different flavors of ice cream and each having a set of gears therein. Substituted for the discharge device 11 of Fig. 6 is one of the form shown in Fig. 8 constructed to direct the ice cream from each of the three compartments into a single container shaped to correspond to the block which it is desired to form. The device, like that of Fig. 6, is in the nature of a thick, substantially rectangular closure plate attached to the bottom of the casting 15. The plate is formed with a centrally located V-shaped discharge passage 66 through which the ice cream from the intermediate compartment flows and horizontally disposed passages 68 leading from the end compartments toward the central passage 66. The passages 66 and 67 all terminate in rectangular openings lying in the same horizontal plane and immediately adjacent one another. The ice cream thus leaves a discharge spout 68 in a single stream composed of vertical layers and is received in the container properly positioned beneath the spout. The laminated character of the container contents is retained during freezing.

Fig. 9 shows another form of discharge device, the use of which enables the apparatus to fill a container so that a core of one variety of ice cream is completely surrounded by ice cream of another variety. The core may have any configuration and the container likewise may be cylindrical, box-shaped, etc. For this purpose, the hopper 10 and the gear trough 15 are constructed in the same manner as for making the laminated bricks above described, ice cream of one flavor being placed in the end hopper compartments while the intermediate compartment contains ice cream of which the core is to be formed. The discharge device (see Fig. 9) employed is formed with passages 70 opening upwardly into the end compartments of the gear trough and both leading to a central opening 71 defined by a depending spout 72 corresponding in shape to that of the container to be filled. Extending across the discharge device is a cross-bar 69 closing the lower end of the intermediate compartment except for an opening 69ª defined by a spout 70ª which is shaped to correspond to the core to be formed. The spout projects downwardly into the upper end of the opening 71 so that there is a continuous annular passage around the spout through which passage cream may flow from the passages 70 thereby completely enveloping the stream flowing out of the central spout. It will be understood from the above that the forms of discharge device here shown are but a few of the designs which could be employed with the apparatus described.

I claim as my invention:

1. Apparatus for filling containers with semi-fluid material comprising, a hopper having opposite side walls converging near their lower ends to define an upwardly opening trough at its lower end having a plurality of bottom outlets therein, a partition removable upwardly through said hopper and extending transversely of said trough so as to divide the trough into a plurality of compartments each communicating with one of said outlets, a pair of intermeshing gears in each of said compartments with their sides substantially in fluid-tight contact with said partition and the ends of said trough, and a portion of their peripheries substantially in fluid-tight contact with the converging portions of said walls, a pair of shafts extending through said gears and said partition and withdrawable in an endwise direction through a wall of the hopper whereby to permit said gears and partition to be lifted upwardly out of said trough.

2. In an apparatus of the character described, a hopper having a trough-like bottom portion with end walls and curved side walls converging downwardly, a pair of intermeshing gears positioned in the bottom of said hopper with the faces of the gears in fluid tight contact with the end walls, said side walls in part conforming to the radius of said gears and at least one side wall being shaped to permit bodily removal of said gears upwardly through the hopper, and means rotatably supporting said gears permitting such removal.

3. An apparatus for filling containers with semi-fluid material combining, a hopper for containing the material having an elongated trough at its lower end with outlet openings spaced along the bottom thereof, a vertical partition in said trough dividing the latter into spaced compartments both receiving the material from the upper portion of the hopper and each communicating with one of said outlet openings, said trough having side walls with continuous inner surfaces and said partition being adjustable along said walls to vary the size of the compartment defined thereby, a pair of intermeshing gears mounted in each of said compartments and operable upon rotation through predetermined distances to dispense measured quantities of the material through said openings, and a common means for actuating the gears of each set simultaneously.

4. An apparatus for filling containers combining a hopper having a bottom outlet, a pair of intermeshing gear elements housed in the lower portion of said hopper and operable, upon being rotated, to force material from said hopper downwardly through said outlet, an endwise removable shaft journaled in one wall of said hopper and having one of said elements loose thereon, an endwise withdrawable shaft projecting through a wall of the hopper parallel to said first mentioned shaft and having the other element splined thereon, and means for imparting step-by-step advancing movements to the latter shaft.

5. An apparatus for filling containers combining a hopper having a bottom outlet, a pair of intermeshing gear elements housed in the lower portion of said hopper and operable, upon being rotated, to force material from said hopper downwardly through said outlet, a pair of parallel shafts journaled in said hopper and supporting said elements, both of said shafts being withdrawable axially from said elements and the hopper whereby to permit removal of said elements laterally from said hopper.

6. In an apparatus for filling containers, the combination of a hopper for containing the product with which said containers are to be filled, means within the hopper for dispensing measured quantities of the product, a discharge device secured to the hopper and having a downwardly projecting spout through which the product is forced by said dispensing means, vertically movable support below said spout, a tray on' said support loaded with the containers to be filled and adapted to be grasped by one hand of an operator and slid with a step-by-step movement along said support to present successive containers to said spout, and a single manually operable member adapted, when operated, to actuate said dispensing means and raise said support, said member being operable by and within the reach of one hand of the operator while the other hand is grasping said tray.

7. In an apparatus for filling containers, the combination of a pair of upwardly extending intersecting arms mounted at their lower ends to turn on fixed horizontal axes and having a connection at their point of intersection which permits relative flexing of the arms, a horizontal support resting upon the upper ends of said arms and adapted to support containers to be filled, a spout through which material may be discharged in measured quantities, and means for oscillating one of said arms to raise said support toward and lower the same from filling position beneath said spout.

8. In an apparatus for filling containers, the combination of a hopper having a bottom outlet, a pair of intermeshing spur gears housed within the lower portion of said hopper and operable upon being rotated to discharge a measured quantity of material through said outlet, a platform mounted for vertical movement below said outlet and adapted to support containers to be filled, and an oscillatory actuating member operable to advance said gears upon movement in one direction and also to raise said platform toward said outlet and to lower the platform and maintain the gears idle upon movement in the opposite direction.

9. In an apparatus for filling containers, the combination of a hopper having a bottom outlet, a pair of intermeshing spur gears housed within the lower portion of said hopper and operable upon being rotated to discharge a measured quantity of material through said outlet, a platform mounted for vertical movement below said outlet and adapted to support containers to be filled, means by which the stroke of said member may be lengthened or shortened to change the amount of material dispensed by said gears, and independently operable means by which the movement of said platform during each stroke of said member may be varied.

10. An apparatus for filling containers comprising, in combination, a hopper having a bottom outlet, intermeshing gear elements housed within the lower portion of said hopper and operable to dispense material contained in said hopper through said outlet in quantities determined by the extent of rotation of the elements, a vertically movable member for supporting containers beneath said outlet, an oscillatory actuator having a driving connection with said member and a one-way driving connection with said elements, and means controlling the degree of oscillation of said member adjustable to vary the quantity of the material dispensed during the active stroke of said actuator.

11. An apparatus for filling containers combining a hopper having a bottom outlet, a pair of intermeshing gear elements mounted within the lower portion of said hopper and operable to dispense material through said outlet in quantities determined by the extent of rotation of said elements, an actuator movable in opposite directions and having a one way drive connection with said elements, an elongated flexible member anchored at one end and attached at the other end to said actuator so as to be slackened during movement of said actuator in one direction and tightened during movement in the other direction, and means by which said member may be lengthened or shortened whereby to change the length of the stroke of said actuator.

12. In an apparatus of the character described, the combination of a spout through which material may be discharged in separate measured quantities, a basket supporting a row of containers to be filled and having a downwardly projecting shoulder thereon, a support for said basket along which the basket may be slid to present the containers successively to said spout, a bar on said support and extending along the latter in the direction of motion of the basket, a plurality of upwardly extending gauging shoulders spaced along said bar according to the spacing of said containers and engageable successively with said first mentioned shoulder to locate the respective containers opposite said spout, said bar being removable and replaceable to adapt the apparatus for filling containers of a different diameter.

13. In an apparatus of the character described, the combination of a spout through which material may be discharged in separate measured quantities, a member supporting a row of containers to be filled, a support for said member along which the basket may be slid to present the containers successively to said spout, a plurality of upwardly extending positioning shoulders on said support spaced therealong in the direction of movement of the member and according to the spacing of said containers, and a cooperating downwardly extending shoulder on said member adapted to be raised out of engagement with one of the positioning shoulders by tilting of the member on said support about an edge remote from the shoulder.

14. In an apparatus of the character described, the combination of a spout through which material may be discharged in measured quantities, a supporting member beneath said spout, a member containing a row of receptacles to be filled and adapted to be slid along said supporting member to present the successive containers to said spout, a plurality of shoulders spaced along one of said members in the direction of movement of the receptacles and according to the spacing of the latter, a cooperating shoulder on the other member adapted when in engagement with one of said first mentioned shoulders to position one of said receptacles opposite said spout, said shoulders being disengageable upon movement of the members relative to each other.

15. Apparatus for forming, in a container, a block of ice cream having distinct vertically extending layers comprising, in combination, a hopper having a trough at its lower end providing a plurality of spaced compartments each supplied with partially frozen ice cream of different flavors and each having a bottom opening, a pair of intermeshing gear elements in each of said compartments, means for rotating the sets of elements simultaneously to force measured quantities of ice cream through said outlets, a spout receiving the ice cream from one of said outlets and adapted to form a stream having a cross-sectional shape corresponding to one of said layers, a passageway leading from another of said outlets and terminating in a spout discharging a stream contiguous to said first mentioned stream and shaped to correspond to the cross-section of another of said layers.

16. In an apparatus for forming, in a container, a block of ice cream having distinct vertically extending layers of different flavors or colors, the combination of a hopper providing three adjacent compartments for different flavors of partially frozen ice cream and having outlets at their lower ends, means for forcing measured quantities of ice cream through said outlets, a spout providing a downwardly opening discharge passageway communicating with the outlet of the intermediate compartment and operable to form a stream of one flavor, and a spout through which said first mentioned stream is discharged providing passageways receiving the cream from said other compartments and forming stream sections each partially enclosing said first mentioned stream.

17. In an apparatus for forming a block of ice cream having a core of one flavor surrounded by a layer of another flavor, the combination of means adapted to dispense simultaneously a plurality of measured quantities of partially frozen ice cream, means providing a central downwardly extending passage receiving one of said quantities and horizontally disposed passages receiving said other quantities and terminating in an opening circumscribing said central passage.

18. In an apparatus for forming in a container a block of ice cream having distinct vertically extending layers of different flavors, the combination of a hopper providing adjacent vertically extending compartments adapted to contain semi-fluid ice cream of different flavors, outlets at the lower ends of said compartments arranged to unite the cream discharged from all of the compartments and form a single stream of contiguous layers, a device within each of said compartments normally acting to prevent downward flow of ice cream therefrom and adapted when actuated to feed ice cream from the compartment positively and at a uniform rate, and means by which said devices may be actuated simultaneously.

19. In an apparatus for forming in a container a block of ice cream having distinct vertically extending layers of different flavors, the combination of a hopper providing adjacent vertically extending compartments adapted to contain semi-fluid ice cream of different flavors and having bottom outlets, a device in each of said compartments operable to feed ice cream positively down through the compartment outlet, a common means for actuating said devices, a downwardly opening spout for discharging into said container a single stream of ice cream smaller than the container, and means providing separate passageways leading from said outlets into said spout whereby to form the ice cream in contiguous layers as it leaves said spout.

20. In an apparatus for forming in a container a block of ice cream having distinct vertically extending layers of different flavors, the combination of a hopper having vertically extending compartments each having a bottom outlet and adapted to contain semi-fluid ice cream of one of said flavors, means for dispensing simultaneously from said outlets measured quantities of ice cream, and a plate removably secured to said hopper and enclosing said outlets, said plate having a downwardly opening passage receiving ice cream from one of said outlets and a horizontally disposed passage receiving ice cream from another of the outlets and terminating in an opening contiguous with the opening of said first mentioned passage whereby to unite said quantities in a single stream discharging into the container.

21. Apparatus for filling a container with semi-fluid material such as partially frozen ice cream comprising, in combination, a hopper adapted to contain a quantity of said ice cream, a downwardly directed spout communicating with an opening in the bottom of said hopper, feeding means disposed within and substantially filling the bottom portion of said hopper operable to withdraw from above and discharge through said spout a measured quantity of ice cream substantially filling a container, and means for supporting a container beneath said spout with the end of said spout projecting into the container at least to the level to which the container is filled by such measured quantity whereby the ice cream in said spout is slightly compressed therein during the final discharge of the ice cream into the container, said feeding means also acting to sustain the weight of the bulk of ice cream in said hopper whereby dripping of ice cream from said spout while said feeding means is inoperative is prevented effectually by virtue of the compressed condition of the ice cream retained in said spout.

22. In an apparatus for filling containers, the combination of a hopper for containing the product with which said containers are to be filled and having a downwardly projecting spout, dispensing means adapted when actuated to force the product in said hopper through said spout, means by which a row of containers may be supported beneath said hopper for horizontal movement successively into alinement with said spout and also for vertical movement to project said spout into the mouth of one of said containers, and a common means operable to actuate said dispensing means and effect vertical movement between said spout and row of containers in timed relation whereby to position the end of said spout within one of said containers during the discharge of material therefrom and retract the containers below the spout when the dispensing means is idle.

23. In an apparatus for forming a block of ice cream having a core of one flavor surrounded by a layer of another flavor, the combination of means adapted to simultaneously dispense quantities of the differently flavored materials, means providing a central downwardly extending passage receiving one of said quantities, and a laterally extending passage receiving said other quantity and terminating in an opening circumscribing said central passage.

24. In an apparatus for forming a block of ice cream or like material having a core of one flavor surrounded by a material of another flavor, the combination of means adapted to simultaneously dispense quantities of the differently flavored materials, means providing a central passage receiving one of said materials and having a discharge opening, and a passageway receiving the other dispensed material and terminating in an opening circumscribing said first mentioned opening.

SWAN F. ANDERSON.